Figure 3:
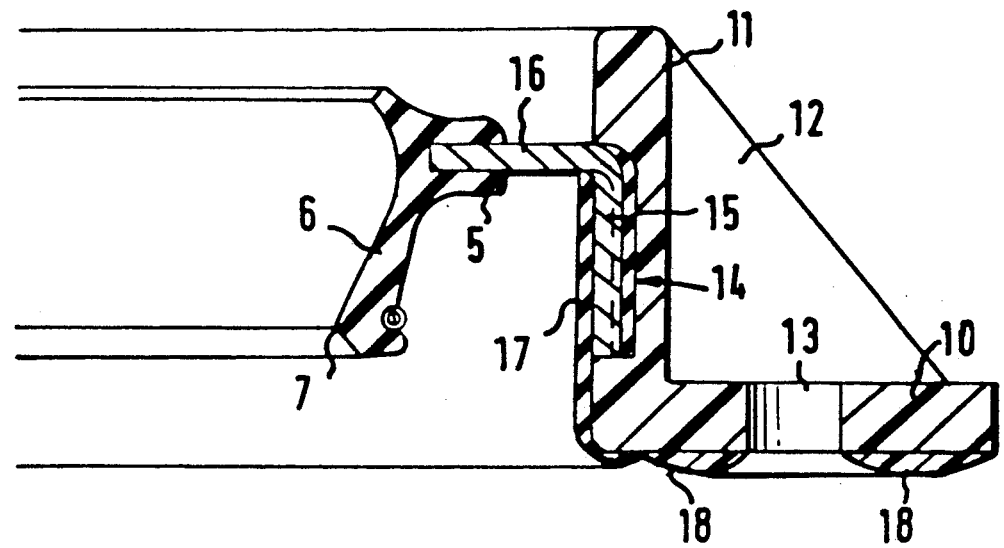

United States Patent [19]
Johnston et al.

[11] Patent Number: 5,123,661
[45] Date of Patent: Jun. 23, 1992

[54] FLUID SEALING STRUCTURE

[76] Inventors: David E. Johnston, 3 Stoneyhurst Road, Gosforth, Newcastle upon Tyne NE3 1PQ; Rui de Jesus Lopes, 27 Holywell Road, North Shields, Tyne and Wear NE29 7NL, both of England

[21] Appl. No.: 664,438

[22] Filed: Mar. 4, 1991

Related U.S. Application Data

[63] Continuation of Ser. No. 481,820, Feb. 20, 1990, abandoned, which is a continuation of Ser. No. 376,219, Jul. 3, 1989, abandoned, which is a continuation of Ser. No. 94,027, Sep. 2, 1987, abandoned, which is a continuation of Ser. No. 656,338, Oct. 1, 1984, abandoned.

[30] Foreign Application Priority Data

Oct. 6, 1983 [GB] United Kingdom ............... 8326706

[51] Int. Cl.⁵ .................................. F16J 15/32
[52] U.S. Cl. .................................. 277/153; 277/166; 277/182; 277/183; 277/189; 277/227; 277/235 R; 277/237 A; 277/DIG. 4
[58] Field of Search ........... 277/152, 153, DIG. 4, 277/237 A, 182, 183, 184, 189, 178, 227, 181; 123/198 F; 425/DIG. 47; 264/262

[56] References Cited

U.S. PATENT DOCUMENTS

| | | | |
|---|---|---|---|
| 2,113,776 | 4/1938 | Smith | 220/327 |
| 2,161,003 | 6/1939 | Berman | 277/183 |
| 2,335,561 | 11/1943 | Dodge | 277/183 |
| 2,348,587 | 5/1944 | Antonelli | 277/183 |
| 2,431,221 | 11/1947 | Allen | 277/166 |
| 2,542,141 | 2/1951 | Horton | 277/184 X |
| 2,709,098 | 5/1955 | Kosatka | 277/235 X |
| 2,837,359 | 6/1958 | Corsi | 277/153 |
| 3,018,127 | 1/1962 | Dobrosielski et al. | 220/327 |
| 3,022,097 | 2/1962 | Seniff et al. | 277/DIG. 4 |
| 3,030,117 | 4/1962 | Cooper | 277/9 |
| 3,053,542 | 9/1962 | Haas | 277/153 X |
| 3,331,611 | 7/1967 | Liebig | 277/178 |
| 3,601,417 | 8/1971 | Szepesvary | 277/181 X |
| 3,606,363 | 9/1971 | Jordan | 277/189 X |
| 3,746,351 | 7/1973 | Tacker, Jr. | 277/153 |
| 3,875,654 | 4/1975 | Ushijima | 425/DIG. 47 X |
| 3,913,924 | 10/1975 | Barefoot et al. | 277/181 |
| 3,975,026 | 8/1976 | Boyle et al. | 277/9 |
| 4,014,556 | 3/1977 | Anderson | 277/181 |
| 4,053,167 | 10/1977 | Jelinek | 277/165 |
| 4,215,869 | 8/1988 | Pendleton | 277/181 |
| 4,261,583 | 4/1981 | deVries | 277/181 X |
| 4,326,723 | 4/1982 | Arai | 277/184 X |
| 4,437,821 | 3/1984 | Ogawa | 277/9 |
| 4,484,751 | 11/1984 | Dearing | 277/153 |

FOREIGN PATENT DOCUMENTS

| | | | |
|---|---|---|---|
| 158956 | 6/1953 | Australia | 277/235 B |
| 663920 | 5/1963 | Canada | 277/183 |
| 2736207 | 2/1979 | Fed. Rep. of Germany . | |
| 554333 | 6/1943 | United Kingdom | 277/152 |
| 578526 | 7/1946 | United Kingdom | 277/153 |
| 583818 | 12/1946 | United Kingdom . | |
| 1106584 | 3/1968 | United Kingdom . | |
| 1191685 | 5/1970 | United Kingdom . | |
| 133068 | 9/1973 | United Kingdom . | |
| 1405562 | 9/1975 | United Kingdom . | |
| 1515822 | 6/1978 | United Kingdom . | |

OTHER PUBLICATIONS

SAE, Technical Paper Series: Shaft Seal Moulded in the Seal Housing which Incorporates a Static Seal Against Cylinder Block and Oil Pan (Rotostat Seal) by Hans Deuring, 1988.

*Primary Examiner*—Allan N. Shoap
*Attorney, Agent, or Firm*—Banner, Birch, McKie & Beckett

[57] ABSTRACT

A casing component, such as a crankcase end cover of an automobile engine, has a fluid seal, such as an oil seal, incorporated with the component by being molded on to a flange which is an integral part of the component.

9 Claims, 2 Drawing Sheets

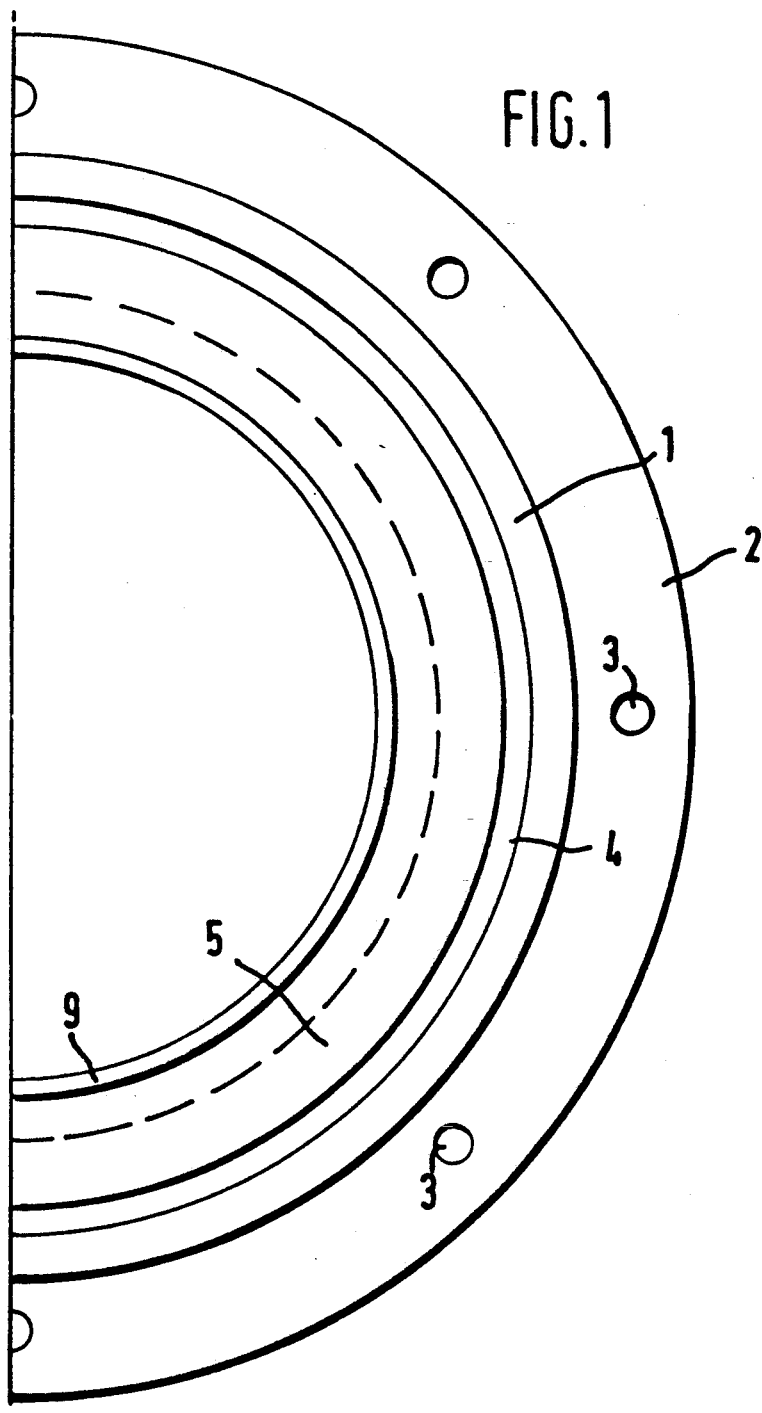
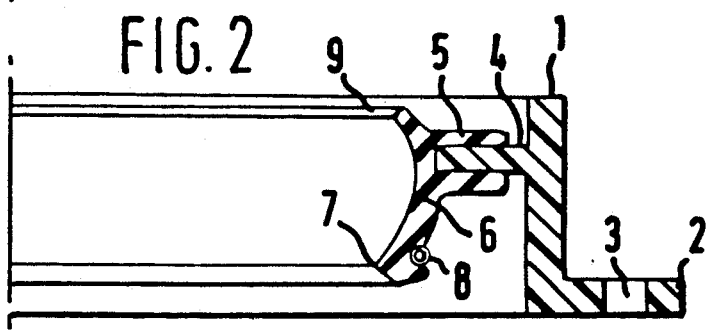

FLUID SEALING STRUCTURE

This application is a continuation of application Ser. No. 07/481,820, filed Feb. 20, 1990, now abandoned, which is a continuation of Ser. No. 07/376,219, filed Jul. 3, 1989, now abandoned, which is a continuation of Ser. No. 07/094,027, filed Sep. 2, 1987, now abandoned, which is a continuation of Ser. No. 656,338, filed Oct. 1, 1984, now abandoned.

This invention relates to a fluid sealing structure for mechanism, such as an automobile engine, in which a relatively movable part, for example a main driving shaft or an auxiliary shaft, passes through a casing component, such as a crankcase end cover, and must be sealed against leakage of fluid, usually oil.

Seals for this purpose, commonly called oil seals, are basically rings of elastomeric material which make a wiping seal contact, by an inner periphery, with the shaft or other member to be sealed and a static seal, by an outer periphery, in a housing recess or other seat in the component in which they are mounted.

The static seal of an oil seal in its housing seat is usually an interference fit. Seals may be metal-cased, often with a coating of sealant, or may have an outer peripheral holding portion of elastomeric material. In either case, an oil seal must be very carefully installed so as to establish a static seal in its seat and a wiping seal with the sealed shaft or other member, without damage to any of the sealed or sealing surfaces. This requires experience, skill and care so as to establish simultaneously the wiping seal at the inner periphery and the static seal at the outer periphery of the sealing ring.

It has been proposed, in U.K. patent specification No. 1 106 584, to provide a bearing sealing case with an outer seal case, which is a sheet metal stamping, of stepped shape with axial and radial wall portions, of which the outer rim is beaded and mounted, as a press fit, in an annular projection at the end of a bearing cup, i.e. an outer race, and the inner rim has a seal ring bonded to a lip thereof. In this proposal, the outer seal case is, in effect, a seal-insert ring radially extended and stepped for engagement by a press tool for removal of the seal from the bearing assembly.

In semi-skilled, and even automated, assembly of mechanisms, for example engines or motors, the positioning of such casing components as closing plates and covers, and securing them by such means as screws or nuts on studs, is a straight-forward operation which can be reliably performed.

The present invention enables a corresponding, simple and reliable, operation to be employed in the installation of oil seals with consequent reliability as well as economy.

We have realised that casing components which are substantially unstressed, so that they do not carry working loads and are therefore not liable to distortion on assembly or in use, and which are used for the housing of fluid seals, are suitable for pre-assembly with seals, prior to the casing components being installed to complete the casings of which they form part.

To be of value, such pre-assembly must be reliable, in terms of accurate location in the casing component and avoidance of damage to the seal. The usual method of press-fitting seals in casing components, as a pre-assembly operation, would only transfer to a pre-assembly stage the problems of press-fitting seals in casing components already installed.

The invention comprises a casing component to form a detachable, but positively located and substantially unstressed, part of a casing for mechanism of which a relatively movable member extends through an aperture in the casing component, the component having around the aperture a seat for a fluid seal having an elastomeric sealing element to make sealing contact with the relatively movable member, in which the seat includes a flange which is an integral part of the casing component and the elastomeric sealing element is moulded directly on to the flange.

In a preferred construction, the casing component is a preformed component itself moulded of plastics material.

The invention thus provides, for the installation or replacement of oil seals, or other fluid seals, instead of an oil seal to be carefully fitted into a seat in a component, a composite component itself incorporating the oil seal, or seals, for relatively simple assembly with the mechanism to be sealed.

Given the dimensional tolerance standards commonly achieved in quantity mechanical production, the positive location on installation of an unstressed casing component, such as a crankcase end cover having marginal holes to fit on to mounting studs, can be relied upon to present an incorporated oil seal accurately on to the shaft or other member to be sealed.

Figure 4:
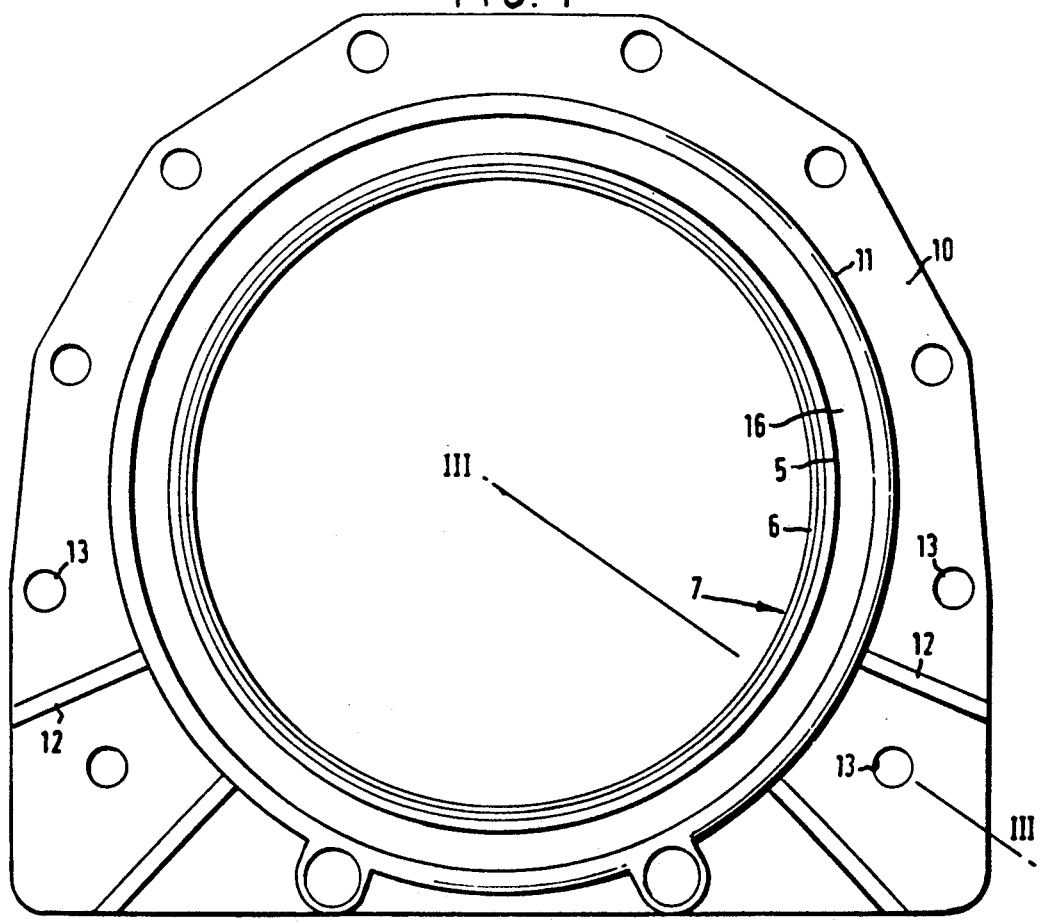

The invention is illustrated by way of example on the accompanying drawings, in which:

FIG. 1 is a half-plan, or axial, view of a simple circular casing end cover with an oil seal incorporated in accordance with the invention, FIG. 2 is an axial-radial section of the casing end cover of FIG. 1, FIG. 3 is an axial radial section, on the line III—III of FIG. 4 which is an end elevation on a smaller scale, of an alternative construction of a crankcase end cover incorporating an oil seal.

As shown by FIGS. 1 and 2, a casing end cover consists of a moulded plastics ring 1 having an outer peripheral flange 2 with stud holes 3 for mounting on studs of a mechanism casing.

In use, a shaft extends through the aperture of the casing end cover and, to provide an annular seat for an oil seal, the cover 1 at its inner periphery is moulded integrally with an inwardly directed peripheral radial flange 4. Moulded in situ on to the flange 4 is a holding portion 5 of an oil seal ring 6, moulded from an oil-resistant synthetic rubber or like elastomer, with a sealing lip 7, a garter spring 8 and a dust lip 9. The form of the oil seal ring as shown is only illustrative and any form of moulded oil seal ring can be used.

In an alternative construction shown by FIG. 3, an engine crankcase end cover consists of a moulded plastics plate 10 with a central ring 11, buttressed by webs 12 at angularly spaced intervals, and stud-mounting holes 13.

To provide for an annular seal seat around its central ring aperture, the plate 10 is formed with an inner circumferential recess 14 in which the axial flange 15 of an L-section metal ring 15, 16 is set and moulded in place by an oil-resistant rubber filling 17. Although made as a sub-component, the metal ring 15, 16 becomes an integral part of the plate 10.

The flange 16 thus forms an integral part of the end cover plate 10 on to which is moulded the holding portion 5 of an oil seal ring otherwise corresponding to that of FIGS. 1 and 2.

The construction illustrated by FIG. 3 enables alternative production methods to be used.

The plastics end cover plate 10 may be assembled with the L-section metal ring already moulded in the recess 14, by the rubber filling 17, and then the oil seal ring is moulded in situ.

Alternatively the oil seal ring first may be moulded on to the flange 16 of the L-section metal ring and then the metal ring may be assembled with the end cover and moulded in place in the ring 10 by the rubber filling 17.

In either case, the L-section metal ring eventually constitutes an integral part of the end cover and enables accurate and permanent assembly of the end cover and the oil seal ring to be effected before the end cover is installed on an engine.

The rubber filling 17 may, according to its hardness, provide a resilient bed for the L-section metal ring and thus for the oil seal ring, permitting some yielding to accommodate for sealed shaft alignment or eccentricity.

Also, the rubber filling 17 is shown extending as a cushion facing 18 round the bend of the ring 11 and over the outer end surface of the cover plate 10. This provides for static sealing and, if desired, some degree of resilience in the fitting of the end cover on to the crankcase.

Although the invention is particularly advantageous for use with a casing component moulded from plastics material, it could be used with other casing components, in particular pressed sheet metal components or die-cast metal components.

We claim:

1. A unitary end cover mountable as a unit for sealing a rotary shaft protruding from an opening in a casing, said end cover comprising:

a substantially rigid, axially elongated body formed of moldable plastic material and having opposing ends defining an axial opening through said body of a diameter to concentrically receive said shaft, mounting flange means on said body defined by a flange extending radially outwardly from adjacent one end of said body, said flange having means thereon for releasable connection to said casing and presenting a surface for face-to-face connection thereto, seal retainer flange means on said body including a continuous, annular flange distinct from said outwardly extending flange extending radially inwardly of said axial opening and having two opposed parallel surfaces terminating in a radially inner rim spaced a radial distance from said body and adapted for concentrically spaced disposition with respect to said shaft, said inwardly extending flange being disposed in said axial opening on the side of a median between said opposing ends remote from said outwardly extending flange;

said radially outwardly extending mounting flange and said radially inwardly extending annular seal retainer flange being formed as an integrated structure with said body; and a continuous, unsplit flexible sealing ring adapted to surround said shaft and having a radially inwardly directed dynamic sealing element for sealingly engaging said shaft, said sealing ring having a radially outwardly directed mounting portion spaced a radial distance from said body and being permanently and sealingly molded directly onto said opposed parallel surfaces and enclosing said inner rim.

2. An end cover as claimed in claim 1 in which said attachment means on said mounting flange means comprises a plurality of circumferentially spaced bolt holes for reception of connectors for accurately locating and removably attaching said cover as a unit to said casing.

3. An end cover as claimed in claim 2 in which said mounting flange means is of an axial extent sufficient to provide structural strength for its mounting function, and said seal retainer flange is of relatively less axial extent than said mounting flange.

4. An end cover as claimed in claim 3 in which said sealing ring is a molding of elastomeric material.

5. An end cover as claimed in claim 4 in which said sealing ring is a molding of oil-resistant synthetic rubber.

6. An end cover as claimed in claim 5 wherein said body with said outwardly extending flange and said annular inwardly extending flange is formed as a one-piece molding of plastic material.

7. An end cover as claimed in claim 1 in which said seal retainer flange means is formed separate from said body, said body having an annular, axially extending ring defining said axial opening, means forming an inwardly facing mounting recess intermediate axial ends of said annular ring for mounting said seal retainer flange, and means for fixedly securing said seal retainer flange in said mounting recess.

8. An end cover as claimed in claim 7 in which said seal retainer flange means is defined as a substantially annular metal member of generally L-shaped section including an axially extending portion having a leg extending radially therefrom, and a flexible filling means for fixedly securing the axially extending portion of said member in said mounting recess.

9. A unitary end cover mountable as a unit for sealing a rotary shaft protruding from an opening in a casing, said end cover comprising:

a substantially rigid, axially elongated body having opposing ends defining an axial opening through said body of a diameter to concentrically receive said shaft;

mounting flange means on said body defined by a flange extending radially outwardly from adjacent one end of said body, said flange having means thereon for releasable connection to said casing and presenting a surface for face-to-face connection thereto;

seal retainer flange means on said body including a continuous, annular flange, distinct from said outwardly extending flange extending radially inwardly of said axial opening and having two opposed surfaces terminating in a radially inner rim spaced a radial distance from said body and adapted for concentrically spaced disposition with respect to said shaft, said inwardly extending flange being disposed in said axial opening on the side of a median between said opposing ends remote from said outwardly extending flange;

said radially outwardly extending mounting flange and said radially inwardly extending annular seal retainer flange being formed as an integrated structure with said body;

a continuous, unsplit flexible sealing ring adapted to surround said shaft and having a radially inwardly directed dynamic sealing element for sealingly engaging said shaft, said sealing ring having a radially outwardly directed mounting portion spaced a radial distance from said body and being permanently molded directly onto said opposed surfaces and enclosing said inner rim.

* * * * *